US009573686B2

(12) United States Patent
Barth

(10) Patent No.: US 9,573,686 B2
(45) Date of Patent: Feb. 21, 2017

(54) ADJUSTABLE CLAMPING MOUNT FOR CELL PHONES, TABLETS AND OTHER MOBILE DEVICES

(71) Applicant: Gary Alfred Barth, San Carlos, CA (US)

(72) Inventor: Gary Alfred Barth, San Carlos, CA (US)

( * ) Notice: Subject to any disclaimer, the term of this patent is extended or adjusted under 35 U.S.C. 154(b) by 0 days.

(21) Appl. No.: 14/964,536

(22) Filed: Dec. 9, 2015

(65) Prior Publication Data

US 2016/0159480 A1 Jun. 9, 2016

Related U.S. Application Data

(60) Provisional application No. 62/089,672, filed on Dec. 9, 2014.

(51) Int. Cl.

| | |
|---|---|
| ***F16M 11/00*** | (2006.01) |
| ***B64D 11/00*** | (2006.01) |
| ***H04M 1/04*** | (2006.01) |
| ***F16M 13/02*** | (2006.01) |
| ***F16M 11/04*** | (2006.01) |
| ***F16M 11/10*** | (2006.01) |

(52) U.S. Cl.

CPC ......... *B64D 11/0015* (2013.01); *F16M 11/041* (2013.01); *F16M 11/10* (2013.01); *F16M 13/022* (2013.01); *H04M 1/04* (2013.01); *F16M 2200/022* (2013.01)

(58) Field of Classification Search

CPC ...... F16M 11/10; F16M 13/00; F16M 11/041; F16M 13/02; F16M 13/022; F16M 2200/08; F16M 11/38; F16M 11/2014;F16M 11/24; F16M 11/28; F16M 11/08; F16M 11/04; F16M 2200/024; F16M 11/12; F16M 11/00

USPC .................... 248/276.1, 284.1, 291.1, 229.1, 229.11,248/229.15, 226.11, 228.1, 228.2, 228.6, 230.1,248/230.2, 230.6, 231.31, 231.71, 448, 449, 458

See application file for complete search history.

(56) References Cited

U.S. PATENT DOCUMENTS

| | | | | |
|---|---|---|---|---|
| 8,469,325 | B2 * | 6/2013 | Yu | G10G 5/005 248/231.51 |
| 9,038,971 | B1 * | 5/2015 | Guthrie | F16M 13/022 248/121 |
| 9,206,943 | B2 * | 12/2015 | Chang | A45B 3/00 |
| 2008/0296454 | A1 * | 12/2008 | Carnevali | A47B 21/0314 248/231.71 |
| 2011/0267773 | A1 * | 11/2011 | Macfarlane | G06F 1/1632 361/679.55 |
| 2012/0026684 | A1 * | 2/2012 | Matthews | F16M 11/041 361/679.58 |
| 2015/0090849 | A1 * | 4/2015 | Breitweiser | F16M 11/04 248/230.1 |

* cited by examiner

*Primary Examiner* — Steven Marsh

(57) ABSTRACT

An adjustable clamping mount for cell phones, tablets and other mobile devices has a telescoping clamp, a clamp support arm, and a tightening mechanism. The telescoping clamp has two telescoping arms connecting two clamp halves, allowing the clamp to grip mobile devices of practically any size. An attachment clip of the clamp support arm is intended and shaped for attaching to an airplane tray table. The tightening mechanism allows the telescoping clamp and the clamp support arm to be secured in any desired angle relative to each other.

15 Claims, 7 Drawing Sheets

1 2 3 10 11 12 13 14 16 17 18 19 20 21 22 23 26 27 28 31

ADJUSTABLE CLAMPING MOUNT FOR CELL PHONES, TABLETS AND OTHER MOBILE DEVICES

The current application claims a priority to the U.S. Provisional Patent application Ser. No. 62/089,672 filed on Dec. 9, 2014.

FIELD OF THE INVENTION

The present invention relates generally to mobile device accessories. More particularly, the present invention relates to mounts and clamps for mobile devices.

BACKGROUND OF THE INVENTION

More and more people are using their mobile phones (which are getting larger) and tablets (which are getting smaller) to watch TV shows and movies on planes. People typically are either holding the device in their hand for the entire flight, or putting it on some kind of stand on the tray table and then looking downward the whole time which can cause neck strain. The inventor thought that there must be some device on the market that could attach onto the back of the seat and alleviate this problem.

Turns out, there are not as many options as one would think. Most of them are made for a specific device, so you can't adjust it to accommodate various devices. Other products were large or complicated, or expensive.

It is therefore an object of the present invention to provide a mount for mobile devices which is easy to use, can fold for portability, can accommodate any size mobile device, and can be used to conveniently watch media on airplanes.

DETAIL DESCRIPTIONS OF THE INVENTION

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced without the implementation of some features as they are described. It should be understood that some details have not been described in detail in order to not unnecessarily obscure focus of the invention.

The present invention is an adjustable clamping mount for cell phones, tablets and other mobile devices. The present invention is primarily intended for use on airplanes, enabling a user to mount their mobile device to their tray table for convenience in watching videos or engaging in other uses of the mobile device. The present invention is intended to attach to the back of a tray table that is in the upright position. The present invention also attached to the molded magazine pocket that is located at eye level on some newer airplanes. The components of the present invention may be any suitable material, but preferably are made of injection molded plastic and metal rods.

Figure 1:
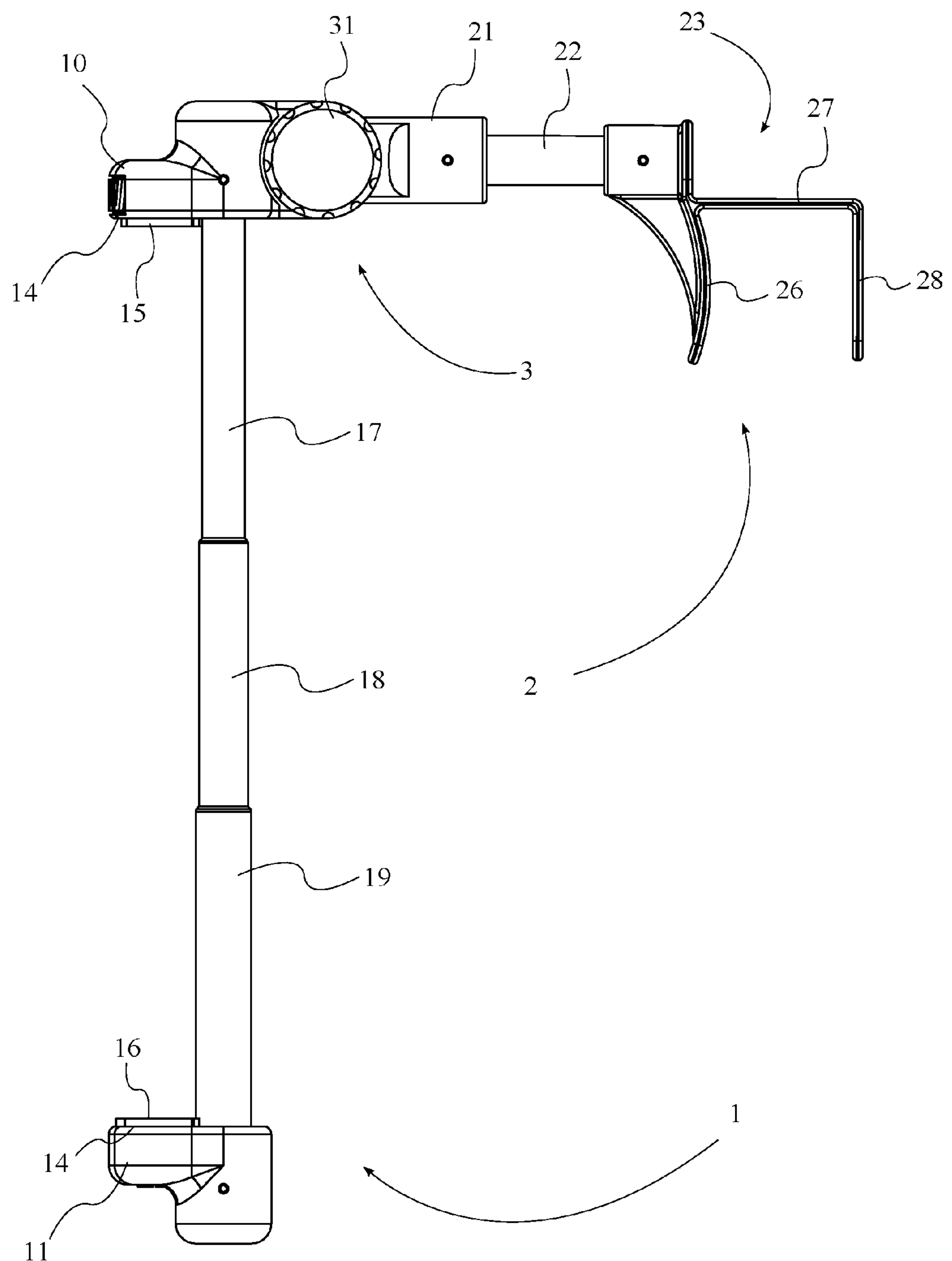
FIG. 1 is a side view of the present invention in an extended state.
Figure 2:
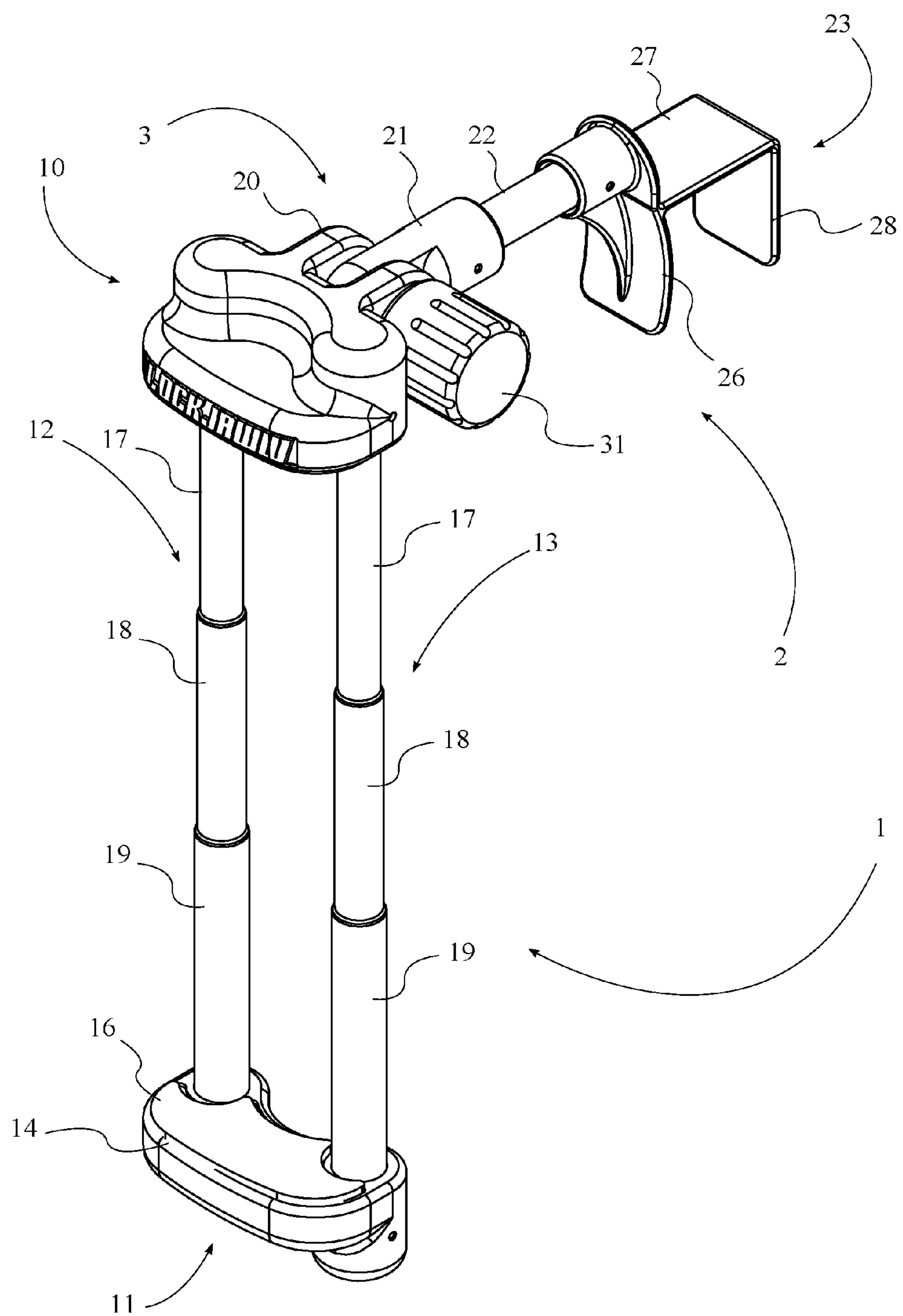
FIG. 2 is a perspective view of the present invention.
Figure 3:
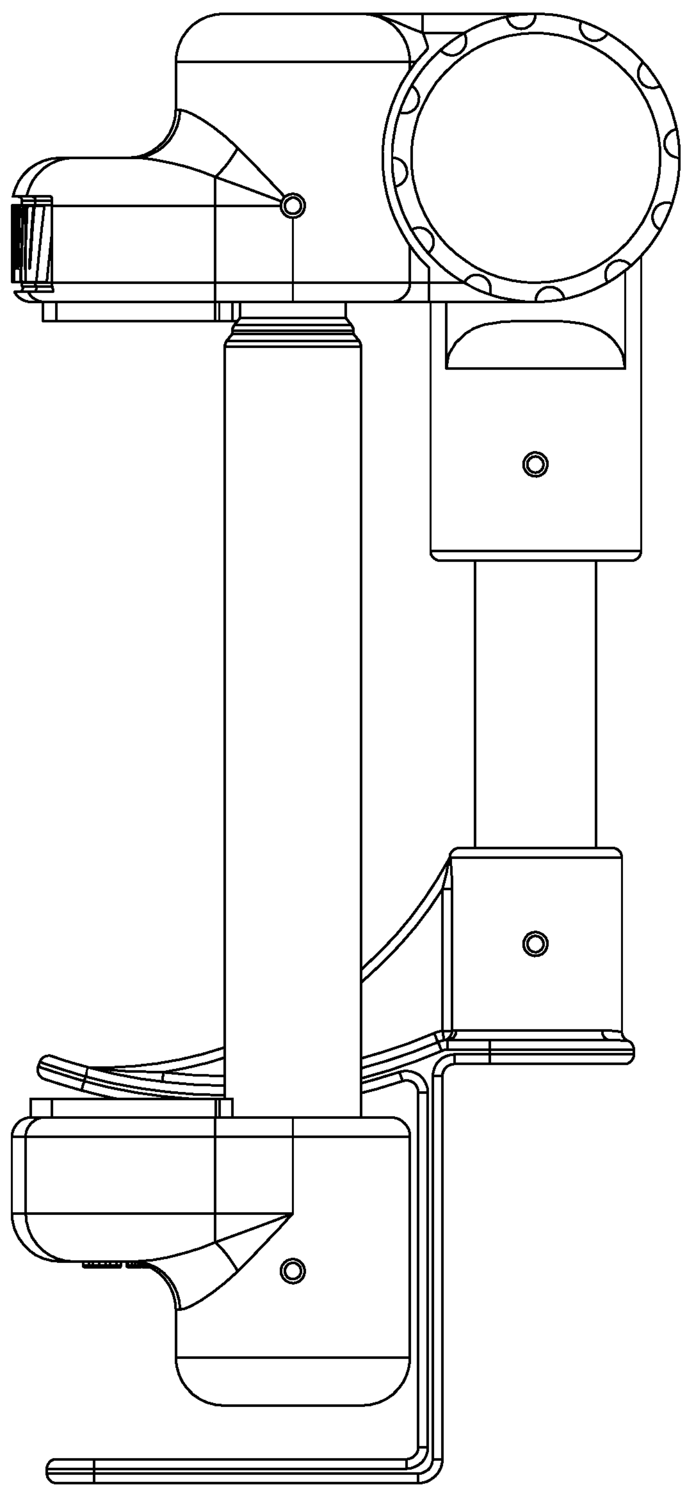
FIG. 3 is a side view of the present invention in a collapsed state.

Referring to FIGS. 1-2, the present invention generally comprises a telescoping clamp 1, a clamp support arm 2, and a tightening mechanism 3. The telescoping clamp 1 is collapsed onto the sides of the mobile device, securing the mobile device in position within the telescoping clamp 1. The clamp support arm 2 is attached to the tray table, or other relevant attachment surface or object, supporting the telescoping clamp 1, and thus the mobile device, in place. The telescoping clamp 1 and the clamp support arm 2 are hingedly connected to each other, allowing adjustment of the user's viewing angle of the mobile device being held within the telescoping clamp 1. The tightening mechanism 3 is operatively engaged with the telescoping clamp 1 and the clamp support arm 2, allowing the user to secure the telescoping clamp 1 and the clamp support arm 2 in any desired angle relative to each other for an optimal viewing angle. A view of the present invention in a collapsed state is seen in FIG. 3.

The telescoping clamp 1 comprises a first clamp half 10, a second clamp half 11, a first telescoping arm 12, and a second telescoping arm. The first clamp half 10 and the second clamp half 11 each comprise a clamping surface 14. The clamping surface 14 is the portion of the clamp half that contacts the edge of the mobile device in order to secure the mobile device in place. The first telescoping arm 12 and the second telescoping arm are connected between the first clamp half 10 and the second clamp half 11, and the first telescoping arm 12 and the second telescoping arm are positioned between the clamping surface 14 of the first clamp half 10 and the clamping surface 14 of the second clamp half 11. Additionally, the first telescoping arm 12 and the second telescoping arm are laterally separated from each other across the clamp halves and oriented parallel to each other, as well as being oriented perpendicular to the clamping surface 14 of the first clamp half 10 and the clamping surface 14 of the second clamp half 11.

Furthermore, a first friction pad 15 is connected to the clamping surface 14 of the first clamp half 10, and a second friction pad 16 is connected to the clamping surface 14 of the second clamp half 11. The friction pad may comprise a foam material, a rubber material, or any material which functions to increase friction between the friction pads and the mobile device in order to secure the mobile device in place in the telescoping clamp 1.

In the preferred embodiment of the present invention, the first telescoping arm 12 and the second telescoping arm each comprise a first telescoping portion 17, a second telescoping portion 18, and a third telescoping portion 19. The first telescoping portion 17 is telescopically engaged with the second telescoping portion 18, and the second telescoping portion 18 is telescopically engaged with the third telescoping portion 19. The first telescoping portion 17 is connected to the first clamp half 10, and the third telescoping portion 19 is connected to the second clamp half 11. The first telescoping arm 12 and the second telescoping arm should not be limited to three telescoping portions, and it is contemplated that any number of telescoping portions may be utilized.

In the preferred embodiment of the present invention, the first clamp half 10 and the second clamp half 11 each comprise a first arm receptacle 101 and a second arm receptacle 102. Opposite ends of the first telescoping arm 12 are positioned within the first arm receptacle 101 of the first clamp half 10 and the first arm receptacle 101 of the second clamp half 11. Similarly, opposite ends of the second telescoping arm are positioned within the second arm receptacle 102 of the first clamp half 10 and the second arm receptacle 102 of the second clamp half 11. The arm receptacles are simply spaces within the clamp halves that the opposite ends of the telescoping arms traverse into. The reason for the arm receptacles is to structurally secure the telescoping arms to the clamp halves and provide sufficient space for the telescoping arms to be connected to the clamp halves while allowing proper telescoping action.

Figure 4:
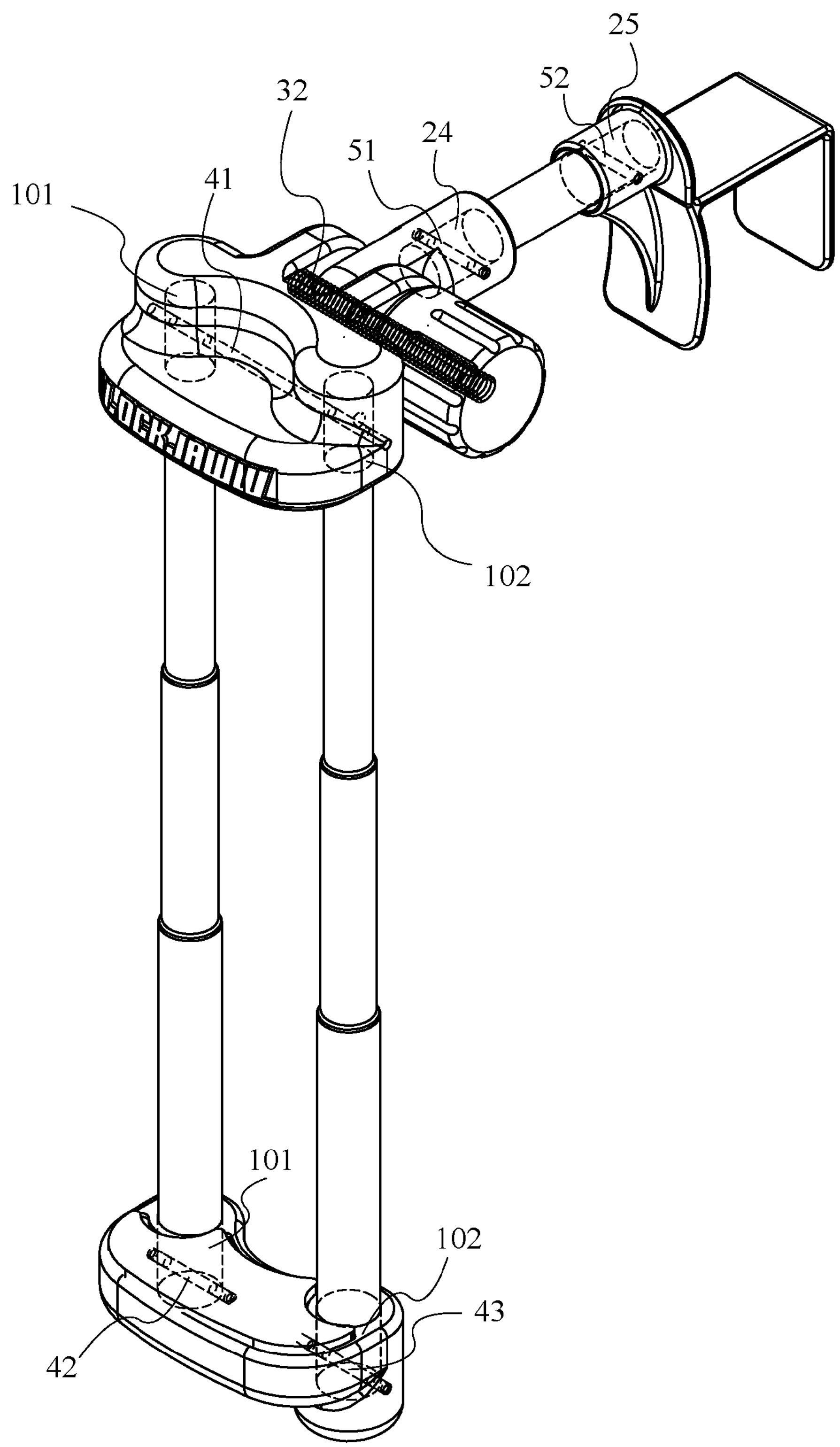
FIG. 4 is a perspective view of the present invention with hidden lines showing internal components.

While it is contemplated that any available and useful means or methods may be utilized to connect the telescoping arms to the clamp halves, in the preferred embodiment of the present invention, pins are utilized. Referring to FIG. 4, an upper clamp pin 41 traverses through the first arm receptacle 101 of the first clamp half 10, the first telescoping arm 12, the second arm receptacle 102 of the first clamp half 10, and the second telescoping arm. A first lower clamp pin 42 traverses through the first arm receptacle 101 of the second clamp half 11 and the first telescoping arm 12. A second lower clamp pin 43 traverses through the second arm receptacle 102 of the second clamp half 11 and the second telescoping arm. Thus, the telescoping arms are connected to the first clamp half 10 by a single pin, and to the second clamp half 11 by two pins, one for each telescoping arm. This arrangement is not necessarily important, however, and other arrangements of pins or other connection may be utilized, so long as the structural arrangement of the telescoping arms being connected between the clamp halves is accomplished.

In the preferred embodiment of the present invention, the clamp support arm 2 comprises an arm hinge portion 21, a clip mounting arm 22 and an attachment clip 23. The arm hinge portion 21 is hingedly connected to the first clamp half 10 of the telescoping clamp 1. The clip mounting arm 22 is connected to the arm hinge portion 21 opposite the first clamp half 10. The attachment clip 23 is connected to the clip mount arm opposite the arm hinge portion 21.

Furthermore, the first clamp half 10 comprises a clamp hinge portion 20, which is connected to the first clamp half 10 laterally offset from the clamping surface 14 of the first clamp half 10. The clamp hinge portion 20 and the arm hinge portion 21 are hingedly connected to each other. In addition, this hinge assembly preferably utilizes a detent system, utilizing grooves and notches to establish predetermined angular stop locations.

Referring to FIGS. 1, 2 and 4, the tightening mechanism 3 comprises a tightening knob 3 and a threaded rod 32. The threaded rod 32 traverses through the clamp hinge portion 20 and the arm hinge portion 21. The threaded rod 32 is restrained against any movement or rotation so that the tightening knob 3 may function by rotating about the threaded rod 32 and moving closer or further away from the hinge due to the threaded screwing action. In the preferred embodiment, a hex nut is constrained within the hinge assembly and connected to the threaded rod 32, thus preventing rotation of the threaded rod 32. The tightening knob 3 is threadedly engaged with the threaded rod 32 and is positioned adjacent to the clamp hinge portion 20 opposite the arm hinge portion 21. In the preferred embodiment, the clamp hinge portion 20 comprises two clamp arms, and the arm hinge portion 21 comprises one clamp arm. Therefore, clamp arm of the arm hinge portion 21 is positioned between the clamp arms of the clamp hinge portion 20. It is contemplated, however, that the clamping arrangement could be reversed, with the clamp hinge portion 20 having one clamp arm, and the arm hinge portion 21 having two clamp arms. In this arrangement, the tightening knob 3 would be positioned adjacent the arm hinge portion 21 opposite the clamp hinge portion 20. Additionally, a washer should be included between the tightening knob 3 and the hinge assembly.

Again in reference to FIG. 4, in the preferred embodiment of the present invention, the clamp support arm 2 is constructed in a similar manner to the telescoping clamp 1, in that pins are used to secure components to each other. To this end the arm hinge portion 21 comprises a hinge arm receptacle 24, and the attachment clip 23 comprises a clip arm receptacle 25. The clip mounting arm 22 is connected between the arm hinge portion 21 and the attachment clip 23 through the opposite ends of the clip mounting arm 22 being positioned within the hinge arm receptacle 24 and the clip arm receptacle 25. A first arm pin 51 traverses through the hinge arm receptacle 24 and the clip mounting arm 22, and a second arm pin 52 traverses through the clip arm receptacle 25 and the clip mounting arm 22. It should be understood, however, that the primary important feature of the clamp support arm 2 is simply to provide a physical, hinged connection between the attachment clip 23 and the telescoping clamp 1. Thus, any other components, arrangements, and connections may be utilized to accomplish this end.

In the preferred embodiment of the present invention, the attachment clip 23 is generally rectangular with one missing side. Thus the attachment clip 23 comprises a proximal clip portion 26, a medial clip portion 27, and a distal clip portion 28. The proximal clip portion 26 is connected to the clip mounting arm 22, the medial clip portion 27 is perpendicularly connected to the proximal clip portion 26 opposite the clip mounting arm 22, and the distal clip portion 28 is perpendicularly connected to the medial clip portion 27 opposite the proximal clip portion 26. The medial clip portion 27 is connected between the proximal clip portion 26 and the distal clip portion 28 at their upper edges, so that an upside down U shape is formed. Alternatively stated, the proximal clip portion 26 and the distal clip portion 28 extend from the medial clip portion 27 away from the clip mounting arm 22, and generally toward the second clamp half 11, depending on the orientation of the clamp support arm 2. In the preferred embodiment of the present invention, the proximal clip portion 26 is curved slightly, so that the proximal clip portion 26 is concave toward the arm hinge portion 21. The reason for this is to accommodate the slightly curved shape often found on airplane tray tables. It is, however, not necessarily a requirement in all embodiments, and other shapes may be comprised for the attachment clip 23, such as, but not limited to, strictly rectangular or otherwise straight, or another shape to accommodate differently shaped tray tables.

Figure 5:
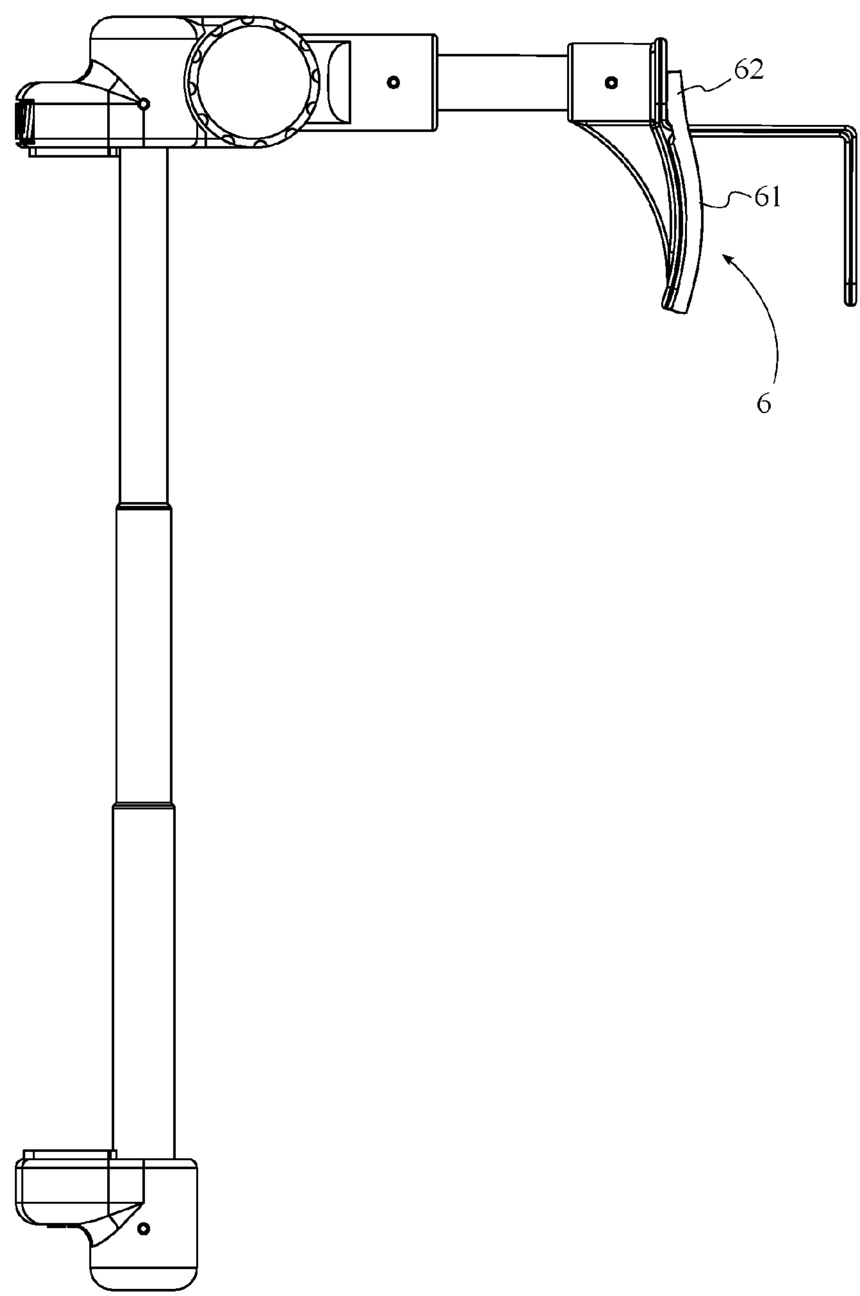
FIG. 5 is a side view of the present invention showing the spacer attachment.
Figure 6:
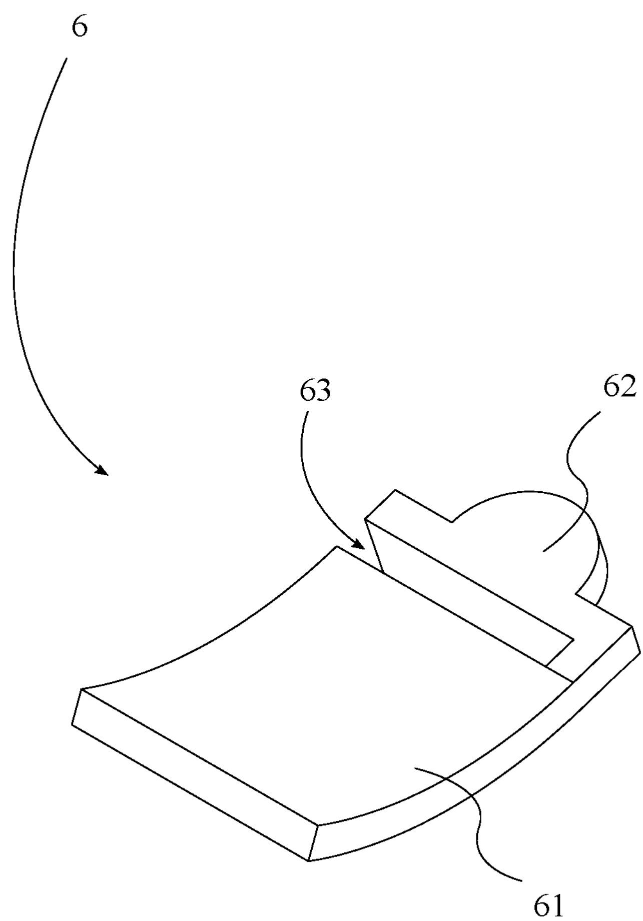
FIG. 6 is a perspective view of the spacer attachment.
Figure 7:
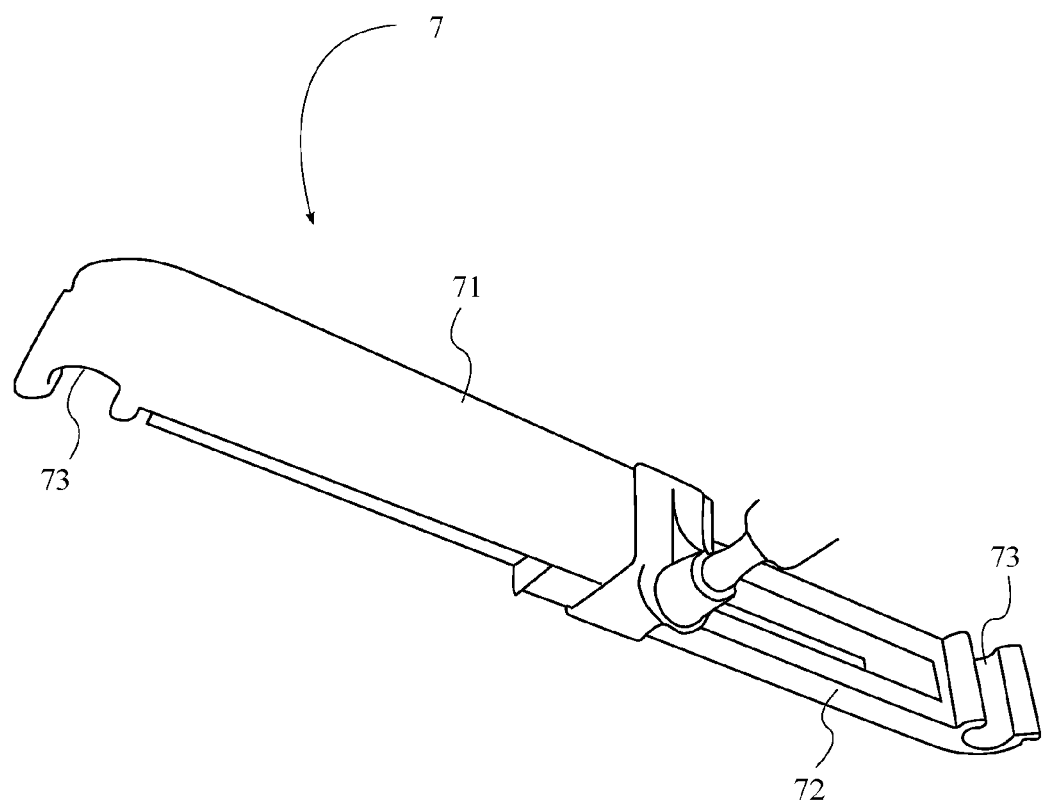
FIG. 7 is a partial view of the present invention showing the headrest attachment in the attachment clip.

The preferred embodiment of the present invention may additionally comprise various attachments for accommodating various other attachment surfaces or objects. One such attachment is a spacer attachment 6, which is shown in FIGS. 5-6. The spacer attachment 6 may be attached to the attachment clip 23 in order to modify the shape and structure of the attachment clip 23 to accommodate differently shaped airplane tray tables. The spacer attachment 6 comprises a spacer body 61, a spacer support portion 62 and a slot 63. The spacer body 61 is connected adjacent to the spacer support portion 62 by enough material to hold them together or more, however much that is. The slot 63 is positioned between the spacer body 61 and the spacer support portion 62. The slot 63 is slidably engaged onto the medial portion of the attachment clip 23, thus positioning the spacer body 61 flush with the proximal clip portion 26 of the attachment clip 23 and modifying the space within the boundaries of the attachment clip 23.

Another attachment that may be used with the present invention is a headrest attachment 7 for use within motor vehicles. The headrest attachment 7 is attached to the headrest posts of a headrest atop a seat in a vehicle, and the attachment clip 23 is attached to the headrest attachment 7. The headrest attachment 7 comprises a first sliding portion 71 and a second sliding portion 72. The first sliding portion 71 and the second sliding portion 72 each comprise a post accepting clip 73, are oriented parallel to each other, and are slidably engaged with each other in order to accommodate any width between headrest posts. The post accepting clip 73 is dimensioned to accommodate a typical diameter of headrest posts. The post accepting clip 73 of the first sliding portion 71 and the post accepting clip 73 of the second sliding portion 72 are positioned opposite each other along the headrest attachment 7. The first sliding portion 71 and the second sliding portion 72 are removably positioned within the attachment clip 23 for use.

Although the invention has been explained in relation to its preferred embodiment, it is to be understood that many other possible modifications and variations can be made without departing from the spirit and scope of the invention as hereinafter claimed.

What is claimed is:

1. An adjustable clamping mount for cell phones, tablets and other mobile devices comprises:
- a telescoping clamp;
- a clamp support arm;
- a tightening mechanism;
- the telescoping clamp comprises a first clamp half, a second clamp half, a first telescoping arm, and a second telescoping arm;
- the first clamp half and the second clamp half each comprise a clamping surface;
- the clamp support arm being hingedly connected to the telescoping clamp;
- the tightening mechanism being operatively engaged with the telescoping clamp and the clamp support arm, wherein the tightening mechanism secures the clamp support arm and the telescoping clamp in a desired angle relative to each other;
- the first telescoping arm and the second telescoping arm being connected between the first clamp half and the second clamp half;
- the first telescoping arm and the second telescoping arm being positioned between the clamping surface of the first clamp half and the clamping surface of the second clamp half;
- the first telescoping arm and the second telescoping arm each comprise a first telescoping portion, a second telescoping portion, and a third telescoping portion;
- the first telescoping portion being telescopically engaged with the second telescoping portion;
- the second telescoping portion being telescopically engaged with the third telescoping portion;
- the first telescoping portion being connected to the first clamp half; and
- the third telescoping portion being connected to the second clamp half.

2. The adjustable clamping mount for cell phones, tablets and other mobile devices as claimed in claim 1 comprises:
- a clip mounting arm being hingedly connected to the first clamp half.

3. The adjustable clamping mount for cell phones, tablets and other mobile devices as claimed in claim 1 comprises:
- the first telescoping arm and the second telescoping arm being oriented perpendicular to the clamping surface of the first clamp half and the clamping surface of the second clamp half.

4. The adjustable clamping mount for cell phones, tablets and other mobile devices as claimed in claim 1 comprises:
- the first clamp half and the second clamp half each comprise a first arm receptacle and a second arm receptacle;
- the first telescoping arm being positioned within the first arm receptacle of the first clamp half and the first arm receptacle of the second clamp half; and
- the second telescoping arm being positioned within the second arm receptacle of the first clamp half and the second arm receptacle of the second clamp half.

5. The adjustable clamping mount for cell phones, tablets and other mobile devices as claimed in claim 4 comprises:
- an upper clamp pin;
- a first lower clamp pin;
- a second lower clamp pin;
- the upper clamp pin traversing through the first arm receptacle of the first clamp half, the first telescoping arm, the second arm receptacle of the first clamp half, and the second telescoping arm;
- the first lower clamp pin traversing through the first arm receptacle of the second clamp half and the first telescoping arm; and
- the second lower clamp pin traversing through the second arm receptacle of the second clamp half and the second telescoping arm.

6. The adjustable clamping mount for cell phones, tablets and other mobile devices as claimed in claim 1 comprises:
- a first friction pad;
- a second friction pad;
- the first friction pad being connected to the clamping surface of the first clamp half; and
- the second friction pad being connected to the clamping surface of the second clamp half.

7. The adjustable clamping mount for cell phones, tablets and other mobile devices as claimed in claim 1 comprises:
- the first clamp half comprises a clamp hinge portion;
- a clip mounting arm of the clamp support arm comprises an arm hinge portion; and
- the clamp hinge portion and the arm hinge portion being hingedly connected to each other.

8. The adjustable clamping mount for cell phones, tablets and other mobile devices as claimed in claim 1 comprises:
- the first clamp half comprises a clamp hinge portion;
- a clip mounting arm of the clamp support arm comprises an arm hinge portion;
- the tightening mechanism comprises a tightening knob and a threaded rod;
- the threaded rod traversing through the clamp hinge portion and the arm hinge portion;
- the tightening knob being threadedly engaged with the threaded rod; and
- the tightening knob being positioned adjacent to the clamp hinge portion opposite the arm hinge portion.

9. The adjustable clamping mount for cell phones, tablets and other mobile devices as claimed in claim 1 comprises:
- the clamp support arm comprises an arm hinge portion, a clip mounting arm and an attachment clip;
- the arm hinge portion being hingedly connected to the first clamp half of the telescoping clamp;

the clip mounting arm being connected to the arm hinge portion opposite the first clamp half; and the attachment clip being connected to the clip mount arm opposite the arm hinge portion.

10. The adjustable clamping mount for cell phones, tablets and other mobile devices as claimed in claim 9 comprises:

a first arm pin;

a second arm pin;

the arm hinge portion comprises a hinge arm receptacle;

the attachment clip comprises a clip arm receptacle;

the clip mounting arm being positioned within the hinge arm receptacle and the clip arm receptacle;

the first arm pin traversing through the hinge arm receptacle and the clip mounting arm; and the second arm pin traversing through the clip arm receptacle and the clip mounting arm.

11. The adjustable clamping mount for cell phones, tablets and other mobile devices as claimed in claim 1 comprises:

an attachment clip of the clamp support arm comprises a proximal clip portion, a medial clip portion, and a distal clip portion;

the proximal clip portion being connected to a clip mounting arm of the clamp support arm;

the medial clip portion being perpendicularly connected to the proximal clip portion opposite the clip mounting arm; and the distal clip portion being perpendicularly connected to the medial clip portion opposite the proximal clip portion.

12. The adjustable clamping mount for cell phones, tablets and other mobile devices as claimed in claim 11 comprises:

the proximal clip portion being curved, wherein the proximal clip portion is concave toward an arm hinge portion.

13. The adjustable clamping mount for cell phones, tablets and other mobile devices as claimed in claim 1 comprises:

a spacer attachment;

the spacer attachment comprises a spacer body, a spacer support portion and a slot;

the spacer body being connected adjacent to the spacer support portion; and the slot being positioned between the spacer body and the spacer support portion.

14. The adjustable clamping mount for cell phones, tablets and other mobile devices as claimed in claim 13 comprises:

the slot being slidably engaged onto a medial portion of an attachment clip of the clamp support arm.

15. The adjustable clamping mount for cell phones, tablets and other mobile devices as claimed in claim 1 comprises:

a headrest attachment;

the headrest attachment comprises a first sliding portion and a second sliding portion;

the first sliding portion and the second sliding portion each comprise a post accepting clip;

the first sliding portion and the second sliding portion being oriented parallel to each other;

the first sliding portion and the second sliding portion being slidably engaged with each other;

the post accepting clip of the first sliding portion and the post accepting clip of the second sliding portion being positioned opposite each other along the headrest attachment; and the first sliding portion and the second sliding portion being removably positioned within an attachment clip of the clamp support arm.

* * * * *